(12) United States Patent
Shih et al.

(10) Patent No.: US 12,379,632 B1
(45) Date of Patent: Aug. 5, 2025

(54) LIQUID CRYSTAL ON SILICON DEVICE WITH AN ADAPTIVE COMPENSATOR

(71) Applicant: OmniVision Technologies, Inc., Santa Clara, CA (US)

(72) Inventors: Wen-Kai Shih, Hsinchu (TW); Ze-Yan Li, Hsinchu County (TW); Ming-Chang Yang, Hsinchu County (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 18/790,452

(22) Filed: Jul. 31, 2024

(51) Int. Cl.
*G02F 1/133* (2006.01)
*G02F 1/13* (2006.01)
*G02F 1/1362* (2006.01)

(52) U.S. Cl.
CPC ........ *G02F 1/136277* (2013.01); *G02F 1/132* (2013.01); *G02F 1/13312* (2021.01)

(58) Field of Classification Search
CPC . G02F 1/136277; G02F 1/132; G02F 1/13312
See application file for complete search history.

(56) References Cited

U.S. PATENT DOCUMENTS

| 7,659,955 B2 * | 2/2010 | Haruyama ........ G02F 1/133634 349/117 |
| 2007/0146293 A1 * | 6/2007 | Leo ...................... G09G 3/3648 345/101 |

\* cited by examiner

*Primary Examiner* — Donald L Raleigh
(74) *Attorney, Agent, or Firm* — MUNCY, GEISSLER, OLDS & LOWE, P.C.

(57) ABSTRACT

A liquid crystal on silicon (LCOS) device includes a liquid crystal on silicon (LCOS) module with a thermal sensor disposed on a circuit board. A compensator with a rotatable device is disposed on top of the LCOS module, and a processing device is formed on the circuit board and responsive to color-specific response trend of thermal signals to control rotation angles of the compensator according to the thermal signals received from the thermal sensor.

20 Claims, 10 Drawing Sheets

LIQUID CRYSTAL ON SILICON DEVICE WITH AN ADAPTIVE COMPENSATOR

TECHNICAL FIELD

The present invention relates to a liquid crystal on silicon (LCOS) device, and more particularly, a LCOS device with an adaptive compensator.

BACKGROUND

Currently there is a demand for display devices in various commercial and consumer applications. For example, Liquid crystal on silicon (LCOS) devices are incorporated into many different mobile and automotive devices for high quality projection. A LCOS display is a miniaturized reflective active-matrix liquid-crystal display using a liquid crystal layer on top of a silicon backplane. The LCOS displays have gained popularity due to its high image quality and ability to display high-resolution images.

LCOS display systems typically include a panel, light sources, and an optical system. The panel consists of an array of pixels in a grid pattern. The liquid crystal layer of the LCOS controls the polarization of light that passes through it, while the silicon substrate provides the necessary electronics to drive the panel and control the individual pixels. In the existing LCOS optical architecture, the liquid crystal molecules in the liquid crystal layer have corresponding light penetration and reflection characteristics for various color-specific light sources, for example red (R), green (G), blue (B) light sources.

Prior art TWI339299B disclosed a phase difference compensator panel, a liquid crystal display panel, and a projection type image display device. The prior art compensates the residual phase difference of the liquid crystal panel. The amount of compensation phase difference is suppressed to a small change between rotation angles when the phase difference compensation plate is set. However, an extra compensator module (two pcs in system for display) is essential to compensate the phase difference, however, the prior art fails to consider thermal issues. It is disadvantage to the contrast ratio value.

When a compensator is applied to attach to the surface of a LCOS module to produce the projection image, it cannot simultaneously satisfy the optimal performance of the R, G, B light sources. For testing the projection image of the LCOS module, the compensator angle of the green light source is usually chosen as the optimal optical response angle, because the green light is the most visible color for human eyes. However, when the LCOS module is bonded to a factory-set fixed-angle compensator and operated over a wide range of ambient temperatures, its optical characteristics are changed due to the reduction of the birefringence of the liquid crystal material with elevated temperature within the LCOS module. Therefore, the original optical performance of the LCOS module, including contrast ratio and color ratio, will drift and is temperature dependent, especially for automotive applications.

Figure 1A:
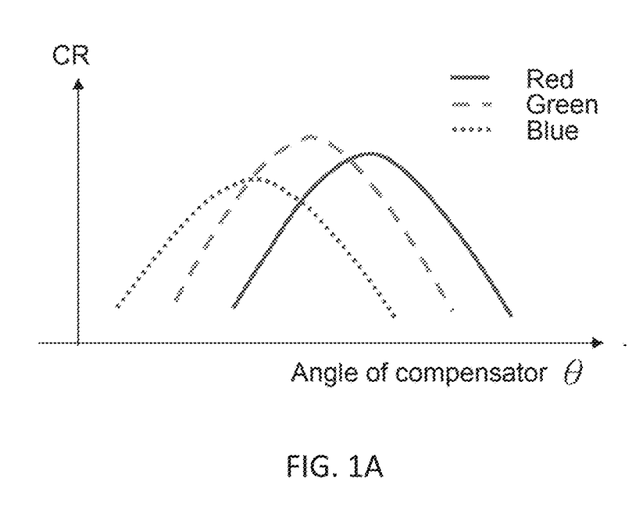
FIG. 1A shows simulated contrast ratio (CR) curves of a LCOS module bonded with a fixed-angle compensator for R, G, B light sources versus the variations of compensator angles according to the prior art.
Figure 1B:
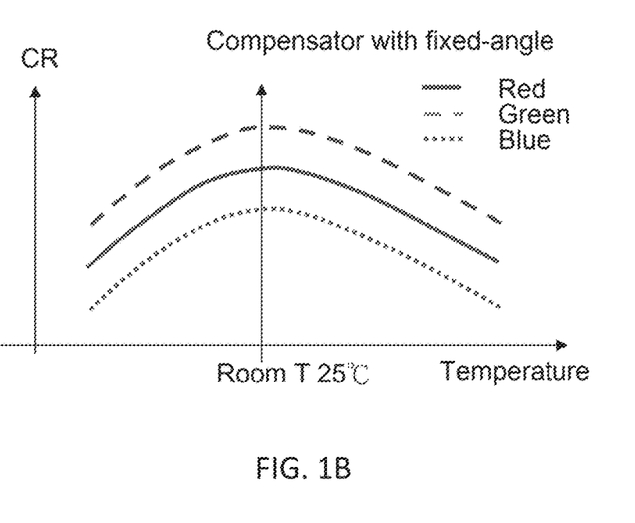
FIG. 1B shows simulated CR curves of the LCOS module bonded with the fixed-angle compensator for R, G, B light sources versus the variations of temperatures according to the prior art.
Figure 1C:
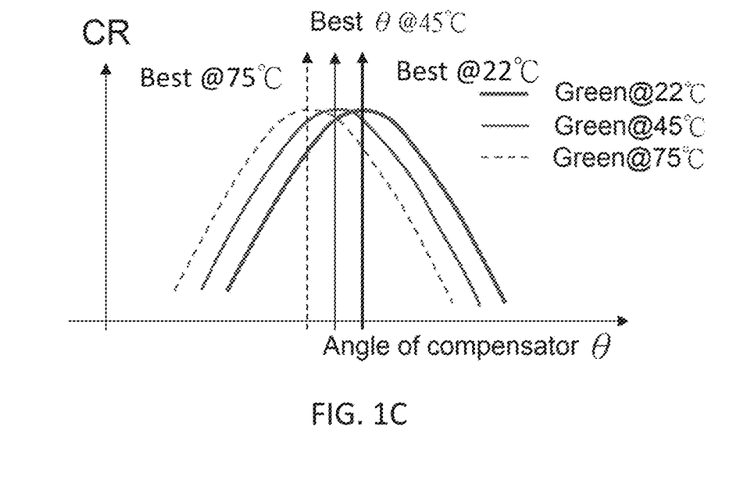
FIG. 1C shows simulated CR curves of the LCOS module bonded with the fixed-angle compensator for green (G) light source versus the variations of compensator angles at 22, 45 and 75° C. respectively according to the prior art.

FIG. 1A shows simulated contrast ratio (CR) curves of the LCOS module for the R, G, B light sources versus the variations of compensator angles, where the LCOS module is operated at 25° C. and the compensator is a factory-set fixed-angle compensator. In FIG. 1A, three simulated curves showing different characteristics of CR response with respect to compensator angles, the optimal optical angle (best angle), i.e., an angle at the peak of the CR curve, is different for individual R, G, B light source. To further illustrate the issues of the temperature dependent contrast ratio (CR) for the LCOS module, FIG. 1B shows three simulated contrast ratio curves of the LCOS module for the R, G, B light sources versus the variations of temperatures, which demonstrates that at the same temperature the G light source has the highest CR value, the R light source has the second highest CR value, and the B light source has the lowest CR value. FIG. 1B demonstrates strong evidence that CR responses for the R, G, B light sources are temperature dependent. FIG. 1C shows three simulated contrast ratio curves of the LCOS device for green (G) light source versus the variations of compensator angles at 22° C., 45° C. and 75° C. respectively. As shown in FIG. 1C, these three CR curves are temperature dependent, where the CR curve at 45° C. is drifted to the smaller angle compared to the CR curve at 22° C., and similarly, the CR curve at 75° C. is drifted to the smaller angle compared to the CR curve at 45° C.

The major issue faced for the conventional LCOS device, including the LCOS module bonded with the factory-set fixed-angle compensator, comes from that the optimal optical angle is predetermined at the moment when the LCOS device is bonded with the factory-set fixed-angle compensator. In this sense, the temperature dependent optical responses of the liquid crystal for the R, G, B light sources can be varied in accordance with the ambient temperature while operating the LCOS device. For example, as shown in FIG. 1C, the factory-set fixed-angle compensator is bonded with the LCOS device at 45° C., the optimal optical angle of the compensator is set at the peak of the CR curve at 45° C. However, when the LCOS device is applied and operated at an ambient temperature that is different from the temperature for assembling or bonding in the factory, for example 75° C., the preset angle of the compensator deviates from its optimal optical angle and degrades the image quality of the LCOS device.

Figure 1D:
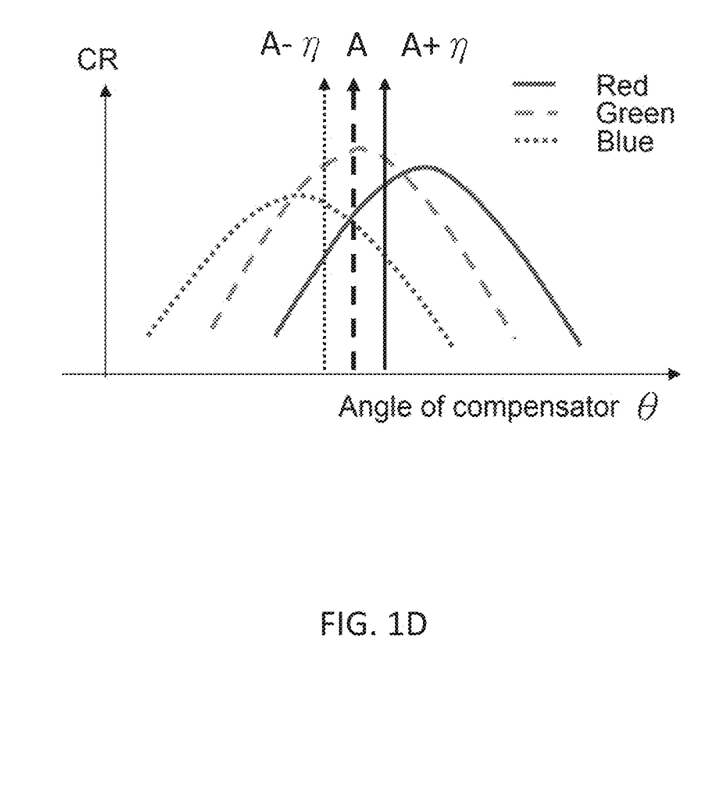
FIG. 1D shows simulated contrast ratio (CR) curves of the LCOS module for R, G, B light sources versus the variations of compensator angles, where the LCOS module is operated at optimal optical angle of the fixed-angle bonded compensator at operation temperature 45° C. according to the prior art.

FIG. 1D is simulated contrast ratio (CR) curves of the LCOS module for the R, G, B light sources versus the variations of compensator angles, where the LCOS module is operated at optimal optical angle of the fixed-angle bonded compensator at operation temperature 45° C. The vertical axis A represents the optimal optical angle of the factory-set fixed-angle compensator bonded with the LCOS device at 45° C., which is also called the bonding angle of the factory-set fixed-angle compensator. The vertical axis A is aligned with the optimal optical angle of the contrast ratio curves of the LCOS device for green (G) light source versus the variations of compensator angles at 45° C. (referring to FIG. 1C). Similarly, please also referring to FIG. 1C, the vertical axis A−η(A+η) is aligned with the optimal optical angle (best angle) of the contrast ratio curves of the LCOS device for green (G) light source versus the variations of compensator angles at 75° C. (22° C.). As the temperature changes from 45° C., the optimal optical angle (best angle) of the contrast ratio curves will deviate from its optimal value due to the temperature dependent characteristic of the CR curves. The CR curve for green (G) light source at 22° C. is drifted to the larger angle compared to the CR curve at 45° C., and similarly, the CR curve for green (G) light source at 75° C. is drifted to the smaller angle compared to the CR curve at 45° C. Simulated results for the CR values of red light compared to that of green light (Ratio R/G), and CR values of blue light compared to that of green light (Ratio B/G) at various temperatures are summarized in Table 1.

TABLE 1

| Temperature | Optimal optical angle | Bonding angle | CR | Ratio R/G | Ratio B/G |
|---|---|---|---|---|---|
| K ° C. | θ = A° | A° | 1000 | 0.7 | 0.7 |
| K − 30° C. | θ = (A + η)° | A° | 800 | 0.8 | 0.6 |
| K + 30° C. | θ = (A − η)° | A° | 800 | 0.6 | 0.8 |

As shown in table 1, at temperature K° C., i.e., 45° C., the CR value is 1000, the Ratio R/G is 0.7, the Ratio B/G is 0.7, and the optimal optical angle A is the same as the bonding angle A of the compensator. When the temperature is decreased to K−30° C., the CR value is reduced to 800, the Ratio R/G is 0.8, the Ratio B/G is 0.6, and the optimal optical angle is (A+7), which is increased η degrees compared to the bonding angle A of the compensator. When the temperature is increased to K+30° C., the CR value is reduced to 800, the Ratio R/G is 0.6, the Ratio B/G is 0.8, the optimal optical angle is (A−η), which is decreased η degrees compared to the bonding angle A of the compensator.

For these reasons, what is required is to solve the issues raised by the conventional fixed-angle compensator bonded LCOS device.

SUMMARY OF THE INVENTION

In one aspect of the present invention, a liquid crystal on silicon (LCOS) device is disclosed. The LCOS device includes a liquid crystal on silicon (LCOS) module with a thermal sensor disposed on a circuit board. A compensator with a rotatable device is disposed on top of the LCOS module, and a processing device is formed on the circuit board. The processing device is responsive to color-specific response trend of thermal signals to control rotation angles of the compensator according to the thermal signals received from the thermal sensor.

In another aspect of the present invention, the LCOS module is operable to perform a setting test by the following steps including monitoring color-specific responses of the LCOS module according to the temperatures measured by the thermal sensor. The next step is to establish the database according to the color-specific responses versus the temperatures. Subsequently, an optimal setting of the compensator is performed by the processing device based on the database, wherein the optimal setting of the compensator is dynamically adjustable according to the temperatures measured by the thermal sensor. Preferably, the database is in form of a lookup table.

In yet another aspect, the color-specific response trend of the thermal signals includes the color-specific responses measured at various angles corresponding to each of the thermal signals. The thermal signals include voltage signals corresponding to temperatures measured by the thermal sensor. The thermal signals include voltage signals corresponding to temperatures measured by the thermal sensor. The rotation angles are obtained by rotating the rotatable device coupled to the compensator through control signals sent from the processing device. Preferably, the rotatable device is an angle actuator.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

To overcome the deficiency encountered by the conventional fixed-angle compensator bonded LCOS device, the LCOS device with an adaptive compensator is disclosed to prevent the optical response from drifting over a wide range of temperatures.

Figure 2A:
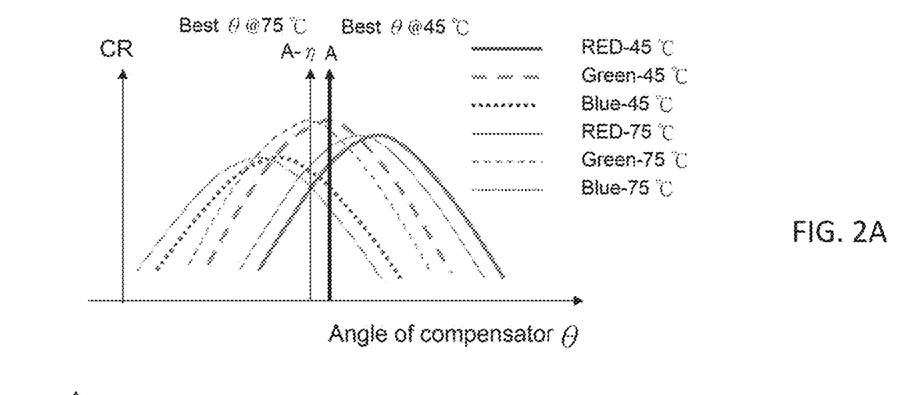
FIG. 2A shows simulated CR curves of the LCOS module with angle-adjustable compensator for the R, G, B light sources at 45° C. and 75° C. according to one embodiment of the present invention.

The simulations of the present invention are performed to calculate the angle adjustment of the compensator based on the thermal and R, G, B optics responses of the LCOS device, such as contrast ratio (CR) of R, G, B light sources versus the variations of compensator angle at different temperatures. FIG. 2A illustrates simulated results, which show that the CR curves of the R, G, B light sources at 45° C. has similar optical characteristic as the CR curves of the R, G, B light sources at 75° C., for example the peak CR values of the R, G, B light sources remained the same while the temperature is increased from 45° C. to 75° C., except that the corresponding CR peaks at 75° C. shift to smaller compensator angle. Because the adaptive compensator can adjust its angle to align with the optimal optical angle (best angle) of the contrast ratio curves of the LCOS device for green (G) light source, therefore the drifting issue of the optical response caused by the temperature change can be corrected by dynamically adjusting the compensator angle. Simulated results for the CR values of red light compared to that of green light (Ratio R/G), and CR values of blue light compared to that of green light (Ratio B/G) at various temperatures are summarized in Table 2.

TABLE 2

| Temperature | Optimal optical angle | Bonding angle | CR | Ratio R/G | Ratio B/G |
|---|---|---|---|---|---|
| K ° C. | θ = A° | θ = A° | 1000 | 0.7 | 0.7 |
| K − 30° C. | θ = (A + η)° | θ = (A + η)° | 1000 | 0.7 | 0.7 |
| K + 30° C. | θ = (A − η)° | θ = (A − η)° | 1000 | 0.7 | 0.7 |

As shown in table 2, at temperature K° C., i.e., 45° C., the CR value of green light G is 1000, the Ratio R/G is 0.7, and the Ratio B/G is 0.7, the optimal optical angle A is the same as the bonding angle A of the adaptive compensator. When the temperature is decreased to K−30° C., the CR value is remained unchanged, the Ratio R/G is 0.7, the Ratio B/G is 0.7, the optimal optical angle is (A+η) and the angle of the adaptive compensator (bonding angle) is also adjusted to (A+η). When the temperature is increased to K+30° C., the CR value is also unchanged, the Ratio R/G is 0.7, the Ratio B/G is 0.7, the optimal optical angle is (A−η) and the angle of the adaptive compensator (bonding angle) is also adjusted to (A−η).

Figure 2B:
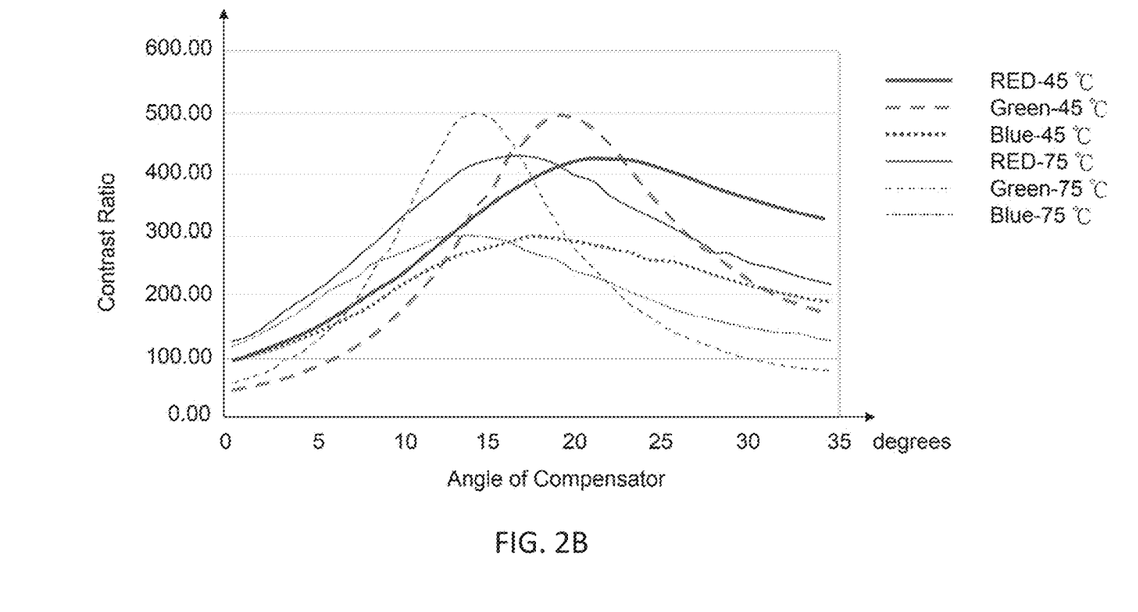
FIG. 2B shows a set of raw data collected by rotating an adaptive compensator disposed on top of a display area of the LCOS device, demonstrating CR curves of the R, G, B light sources versus compensator angles measured at 45° C. and 75° C., respectively, according to one embodiment of the present invention.

FIG. 2B shows a set of raw data collected by rotating the adaptive compensator disposed on top of a display area of the LCOS device, demonstrating CR curves of the R, G, B light sources versus compensator angles measured at 45° C. and 75° C., respectively. By comparing the results depicted in FIG. 2A and FIG. 2B, there exists consistency of the optical performance between the simulated results and the actual experiments. In some embodiments, the raw data can be detected and collected by an optical detector disposed outside the adaptive compensator, for example a photometer, through rotating the adaptive compensator.

Figure 2C:
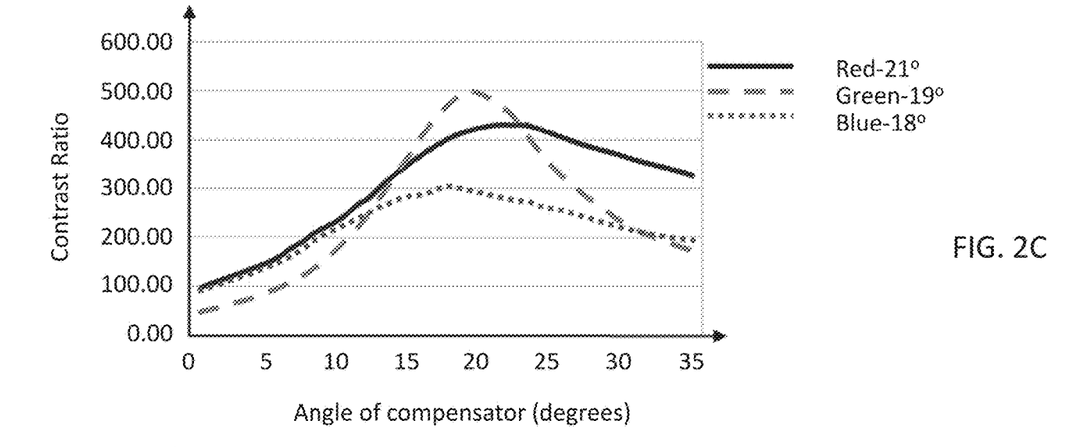
FIG. 2C shows raw data collected by rotating the adaptive compensator disposed on top of a display area of the LCOS device, demonstrating CR curves of the R, G, B light sources versus compensator angles measured at 45° C. according to one embodiment of the present invention.

FIG. 2C shows raw data collected by rotating the adaptive compensator disposed on top of a display area of the LCOS device, demonstrating CR curves of the R, G, B light sources versus compensator angles measured at 45° C. Each of the CR curves of the R, G, B light sources has the optimal optical angle at 21°, 19° and 18°, respectively. Compared FIG. 2C with FIG. 1A, there also exists consistency of the optical performance between the simulated results and the actual experimental results.

Figure 2D:
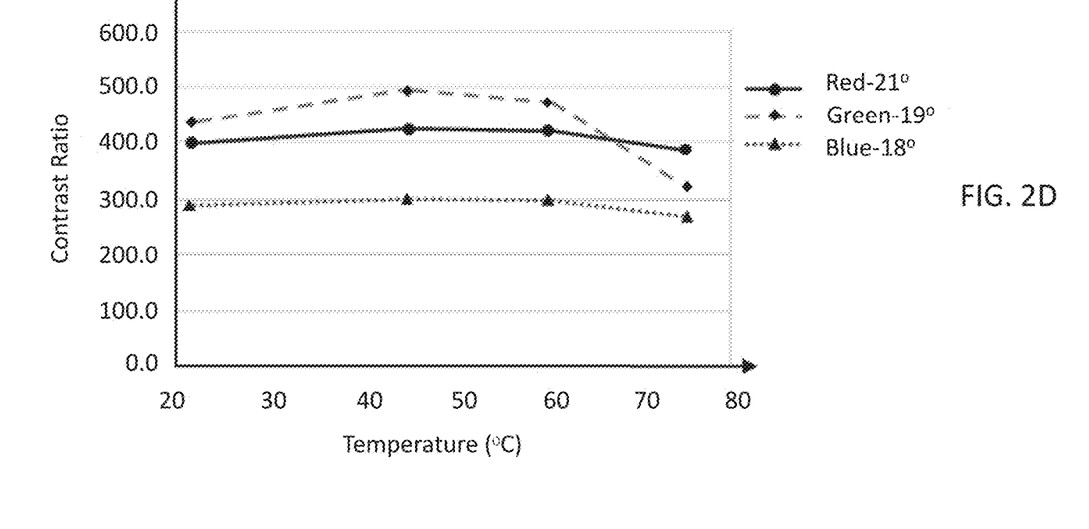
FIG. 2D shows raw data collected by rotating the adaptive compensator disposed on top of a display area of the LCOS device, demonstrating CR curves of the R, G, B light sources versus variations of temperatures according to one embodiment of the present invention.

FIG. 2D shows raw data collected by rotating the adaptive compensator disposed on top of a display area of the LCOS device, demonstrating CR curves of the R, G, B light sources versus variations of temperatures. Compared FIG. 2D with FIG. 1B, they exhibit similar behavior.

Figure 2E:
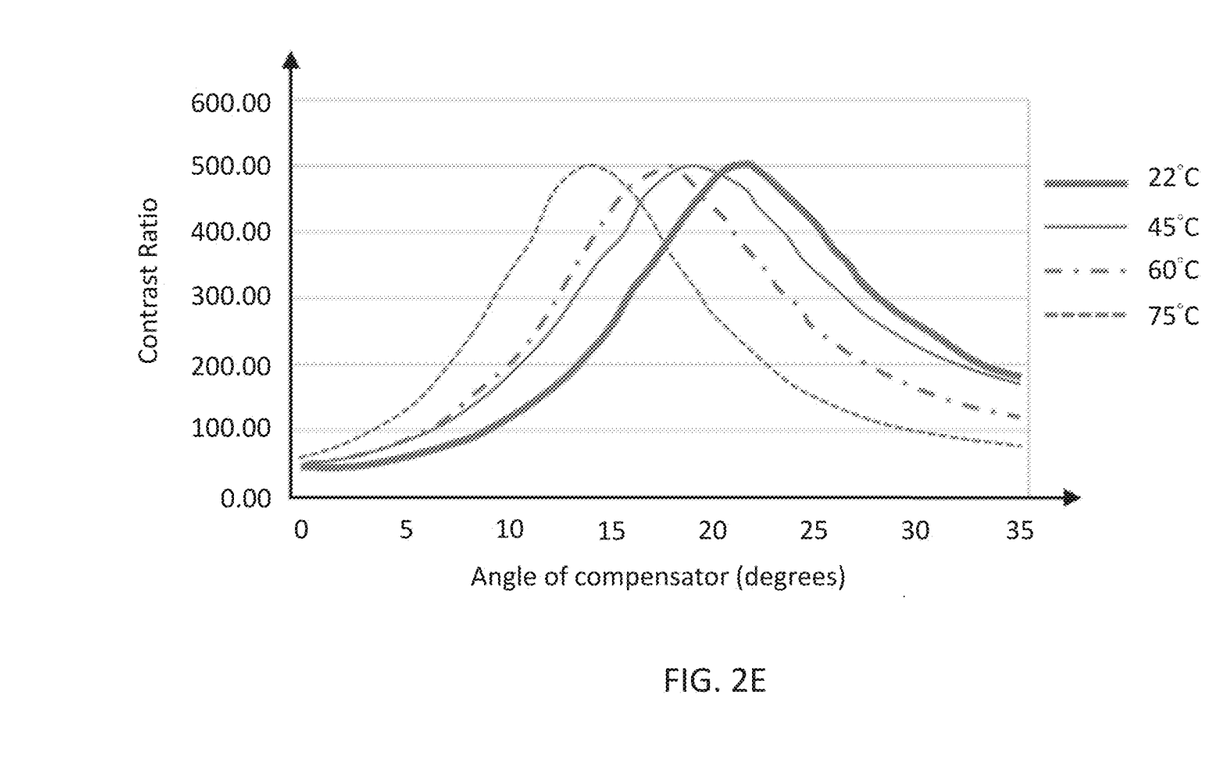
FIG. 2E shows raw data collected by rotating the adaptive compensator disposed on top of a display area of the LCOS device, demonstrating CR curves of the G light source versus compensator angles measured at 22° C., 45° C., 60° C., and 75° C., respectively, according to one embodiment of the present invention.

FIG. 2E shows raw data collected by rotating the adaptive compensator disposed on top of a display area of the LCOS device, demonstrating CR curves of the G light source versus compensator angles measured at 22° C., 45° C., 60° C., and 75° C., respectively. Similarly, compared FIG. 2E with FIG. 1C, they also exhibit similar behavior.

Figure 3A:
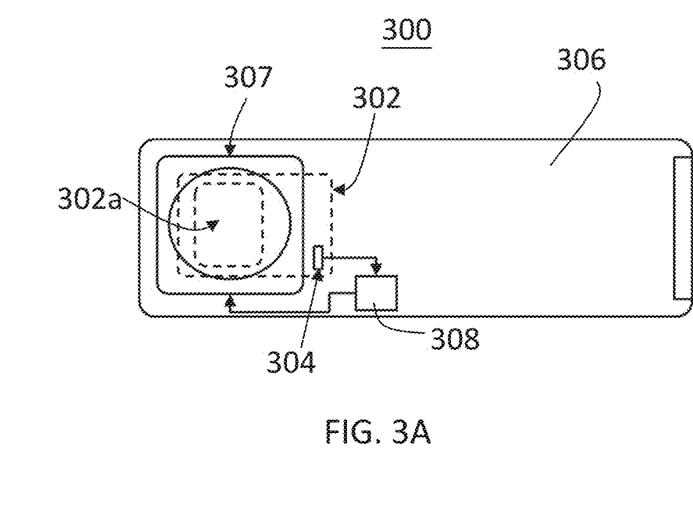
FIG. 3A shows a top view of a LCOS device with an adaptive compensator according to one embodiment of the present invention.
Figure 3B:
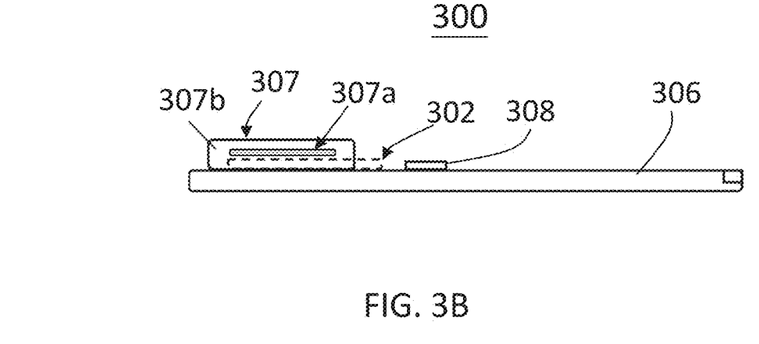
FIG. 3B shows a cross-sectional view of the LCOS device depicted in FIG. 3A.
Figure 3C:
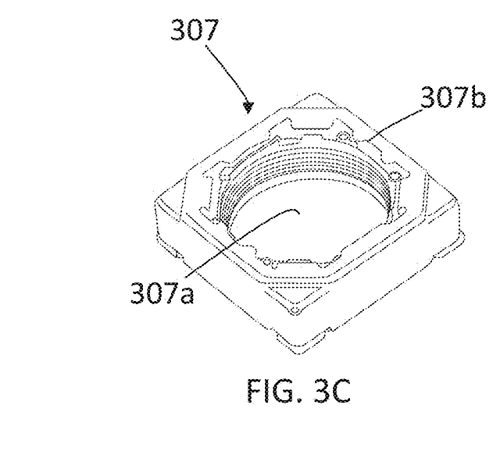
FIG. 3C shows a prospective view of the adaptive compensator according to one embodiment of the present invention.

FIGS. 3A-3B are respectively show the top and the cross-sectional view of the LCOS device 300, which includes a LCOS module 302 with a thermal sensor 304 disposed on a circuit board 306. The adaptive compensator 307 is disposed on the top of the display area 302a of the LCOS module 302, and a processing device 308 is formed on the circuit board 306 in accordance with the present invention. The thermal sensor 304 is electrically connected to the processing device 308. The processing device 308 is responsive to control signals related to color-specific response trend of thermal signals, subsequently, the rotation angles of the adaptive compensator 307 is controlled by the processing device 308, details will be discussed in FIG. 5 and its accompanying description. In some embodiments, the color-specific response trend of thermal signals can be the CR curves of R, G, B light sources versus compensator angles of the adaptive compensator 307 measured at various temperatures. In some embodiments, the thermal sensor 304 includes a temperature sensor embedded in the LCOS module 302 used to measure the temperature of the LCOS module 302. In some embodiments, the thermal signals include voltage signals corresponding to temperatures measured by the thermal sensor 304. FIG. 3C illustrates a prospective view of the adaptive compensator 307, which includes a compensator 307a disposed on the rotation stage 307b. In some embodiments, the adaptive compensator 307 includes the compensator 307a disposed on a rotatable device, for example, the rotation stage 307b. In an alternative embodiment, the rotation stage 307b can be an angle actuator. Preferably, the processing device 308 is coupled to a database (not shown) storing the color-specific response of the thermal signals. In an embodiment, the processing device 308 includes a microcontroller to manage operation. In some embodiments, the processing device 308 includes, but not limited to, a processor, a microcontroller unit (MCU), CPU, GPU or the like. In examples, the processing device 308 is configured to perform one or more functions including controlling an order of energizing power supply voltages of power supplies of the display apparatus, storing a control program, and reacting to events external to the display apparatus. Other examples of microcontroller functions are possible.

Figure 3D:
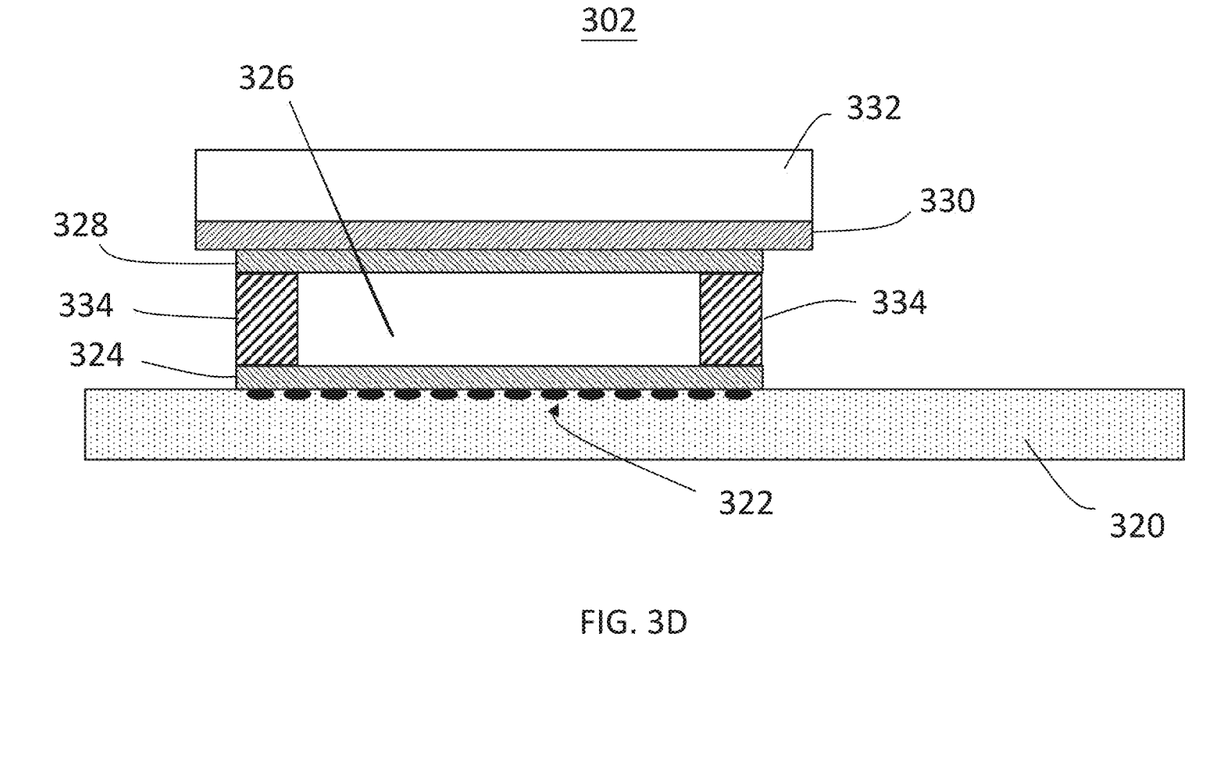
FIG. 3D shows a cross-sectional view of the LCOS module depicted in FIGS. 3A-3B.

FIG. 3D illustrates an example of the LCOS module 302, which includes a substrate 320 having pixel elements 322 formed in the substrate 320, the first alignment layer 324 is formed on the pixel elements 322. In one example, the material of the substrate 320 includes silicon or the like. The liquid crystal layer 326 is sealed between the first alignment layer 324 and the second alignment layer 328 by the perimeter seal 334. A transparent electrode 330 and the cover glass 332 are stacked on the second alignment layer 328. The space enclosed by the first alignment layer 324, the second alignment layer 328 and the perimeter seal 334 is filled with the liquid crystal. One side alignment scheme may also apply in the present invention. The liquid crystal layer 326 controls the polarization of light that passes through it, while the reflective layer reflects the light back towards the optical system. The circuits in the substrate 320 is used to control the individual pixel elements 322 and provides the necessary electronics to drive the panel.

The illustrations depict placement of some of the physical components that may be in aspects the invention. It will be appreciated that the LCOS module 302 shown in FIG. 3D is not necessary drawn to scale. Other type of LCOS module 302 could be used in the present invention.

Figure 4A:
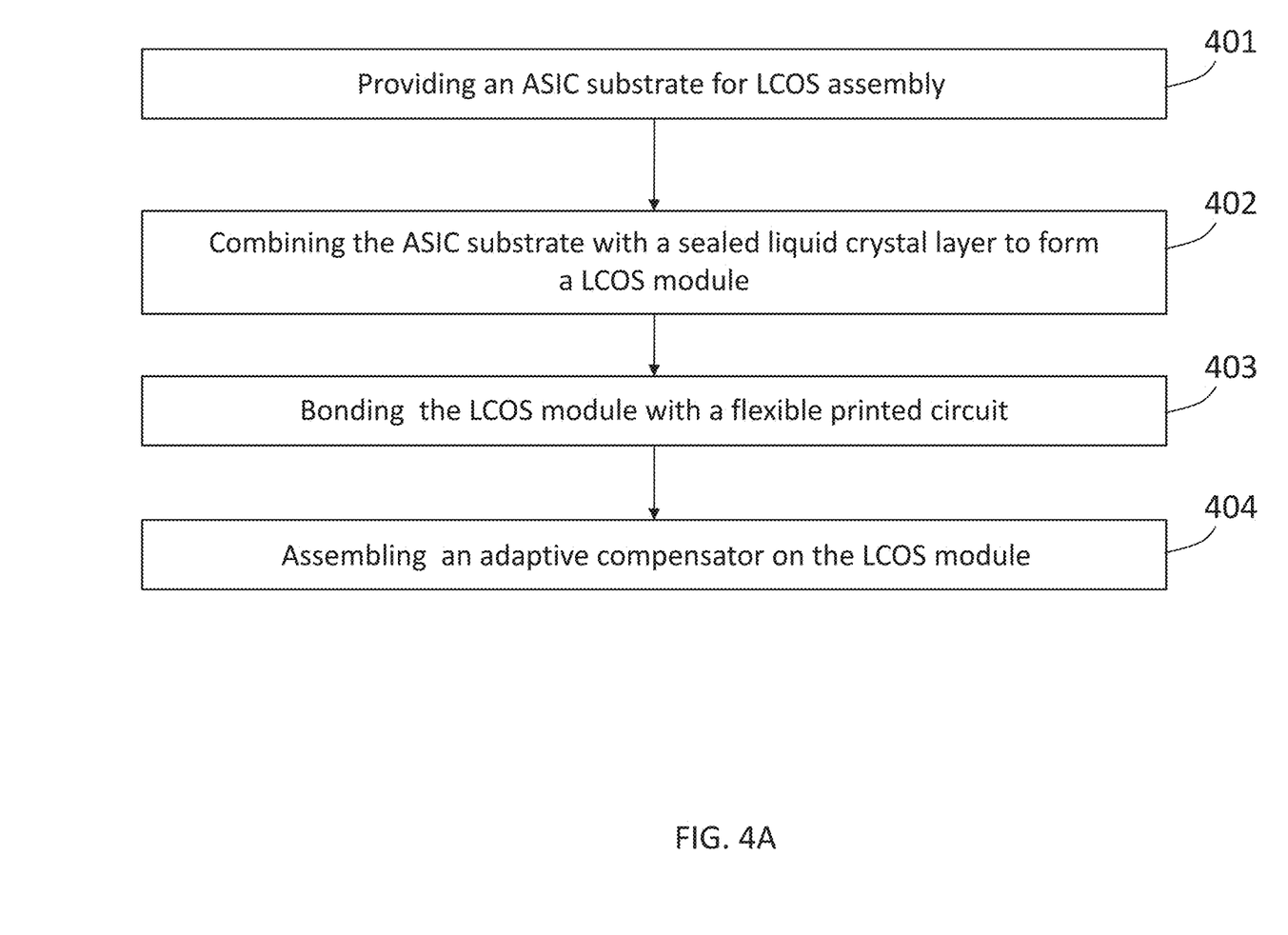
FIG. 4A illustrates an assembly process for the LCOS device according to one embodiment of the present invention.

The substrate 320 includes, for example, application-specific integrated circuit (ASIC) and other devices. A process for assembling the LCOS module 302 is illustrated in FIG. 4A. which includes the following steps. The integration may be accomplished by any appropriate fabrication process. In step 401, the substrate 320 mentioned in FIG. 3D, is provided for LCOS module assembly, the display driver circuitry and/or ASIC are formed in the substrate 320 in advance (referring to FIG. 3D), and the pixel elements 322 are formed in the substrate 320 as well. In step 402, a sealed liquid crystal layer 326 is combined with the substrate 320 to form the LCOS module 302. During the step, alignment procedure is required to make sure that the electrodes and the pixel elements 322 are aligned. In step 403, the LCOS module 302 is bonded with a flexible printed circuit board. Other suitable material could be used for the flexible PCB. In step 404, the LCOS module 302 is assembled with the adaptive compensator 307 (referring to FIG. 3), which includes the compensator 307a disposed in the rotation stage 307b (referring to FIG. 3).

Figure 4B:
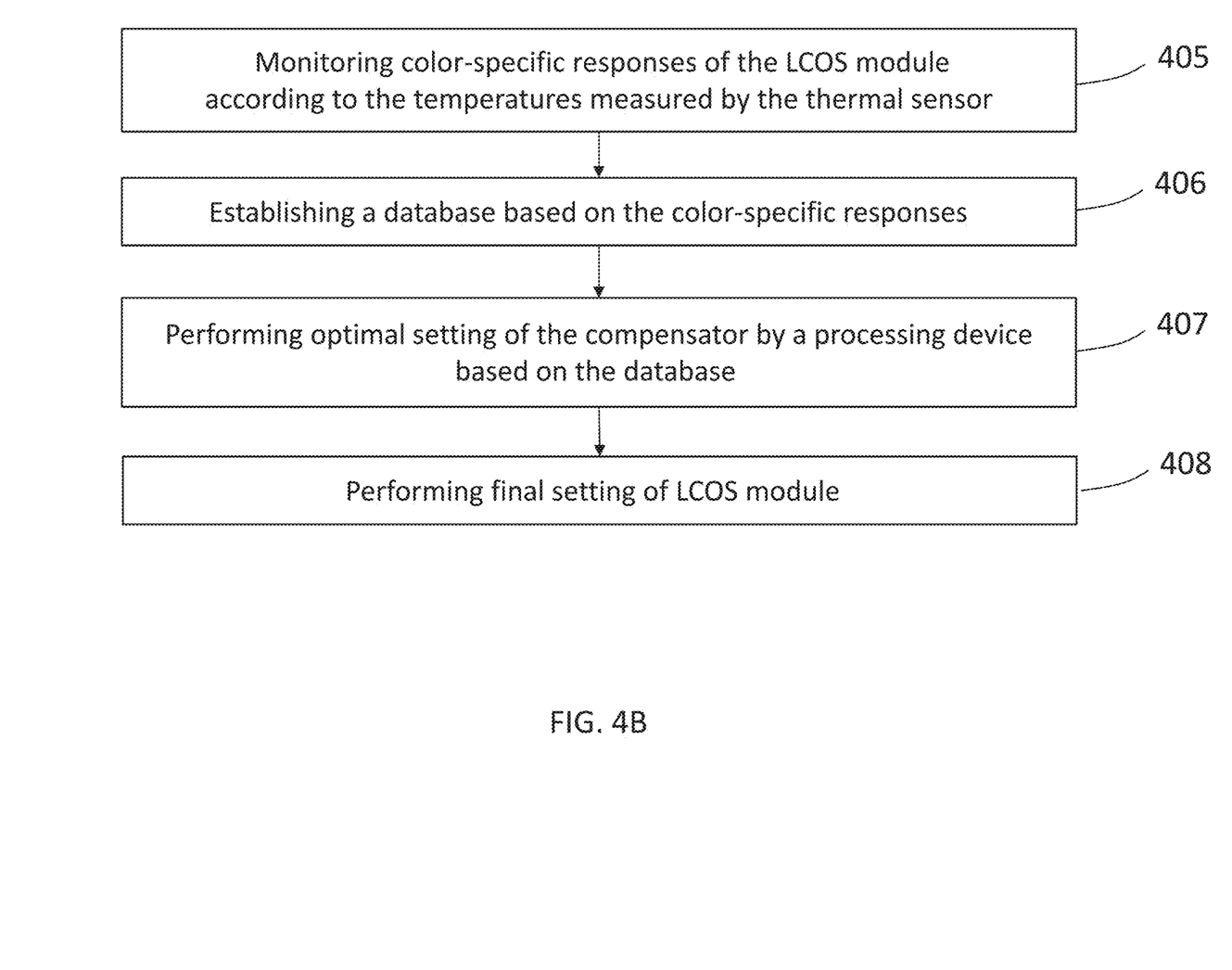
FIG. 4B illustrates a setting test process for the LCOS device according to one embodiment of the present invention.

After the LCOS module 302 (referring to FIG. 3) is assembled with the adaptive compensator 307, the LCOS module 302 is operable to perform a setting test, as illustrated in FIG. 4B, which includes the following steps. In step 405, color-specific responses of the LCOS module 302 with the adaptive compensator 307 are monitored (referring to FIG. 3) according to the temperatures measured by the thermal sensor 304. In some embodiments the color-specific responses of the LCOS module 302 (referring to FIG. 3) may include contrast ratio signals of the LCOS module 302 for R, G, B light sources. The contrast ratio signals can be detected and collected by the optical detector disposed outside the adaptive compensator, for example the photometer, through rotating the adaptive compensator 307. In step 406, a database is established to store the color-specific response trend of the thermal signals mentioned in FIG. 3A according to the color-specific responses, where the color-specific response trend of the thermal signals includes the color-specific responses measured by the optical detector disposed outside the adaptive compensator 307, for example the photometer, through rotating the adaptive compensator 307 at various angles corresponding to each of the thermal signals. In some embodiments, the color-specific response trend of thermal signals can be the CR curves of R, G, B light sources versus compensator angles of the adaptive compensator 307 measured at various temperatures. In step 407, an optimal setting of the adaptive compensator 307 is performed by the processing device 308 based on the database established in step 406. The optimal setting of the adaptive compensator 307 is dynamically adjustable according to the temperatures measured by the thermal sensor 304. Lastly, in step 408 a final test (final setting) of the LCOS module 302 is performed to complete the test process.

Figure 5:
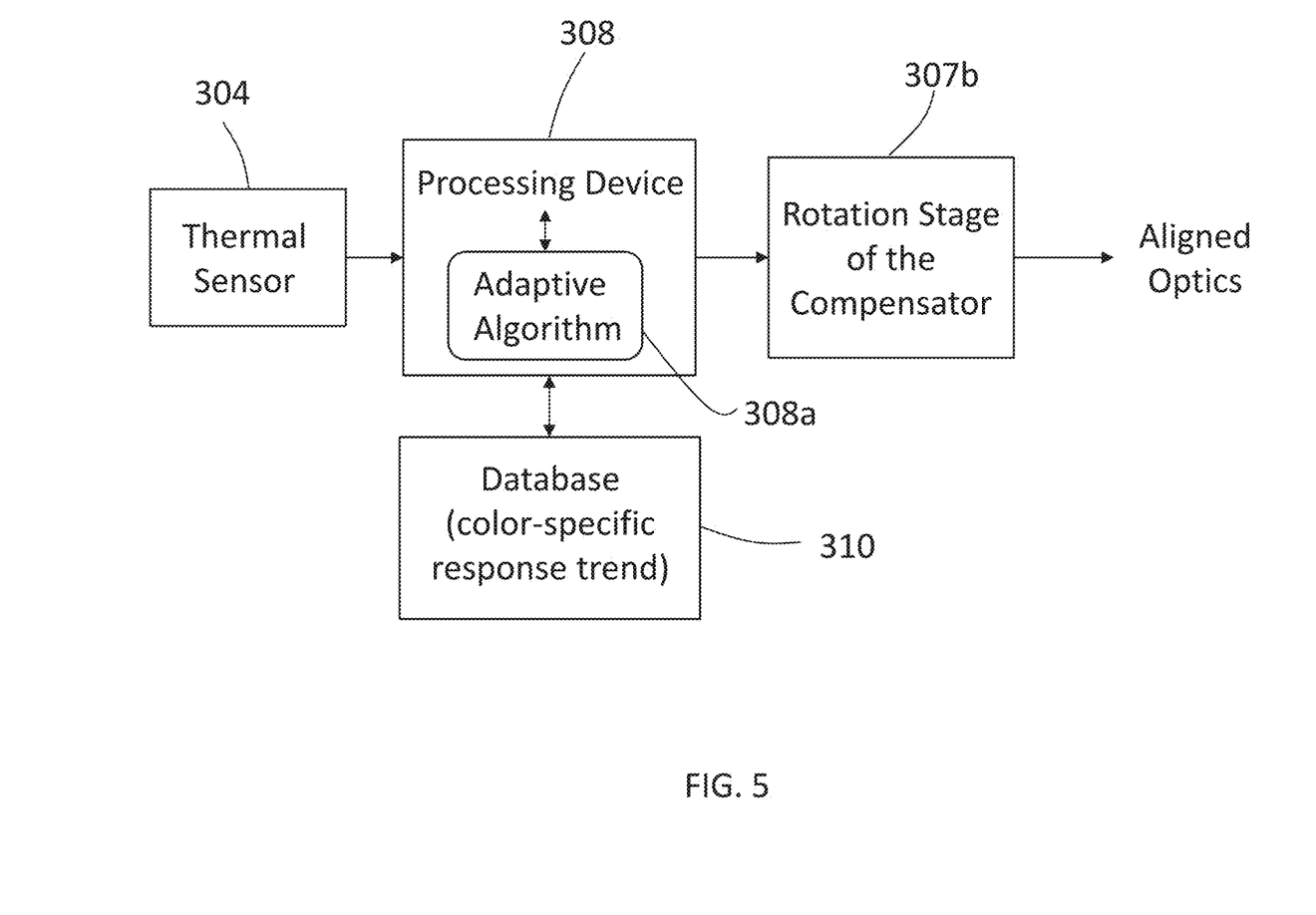
FIG. 5 illustrates a functional block diagram for aligning the compensator to obtain its optimal setting based on the established database according to one embodiment of the present invention.

FIG. 5 illustrates a functional block diagram which shows the alignment of the adaptive compensator 307 (referring to FIG. 3) to obtain its optimal setting based on the established database. Referring to FIGS. 3A-3B, the processing device 308 is electrically connected to the adaptive compensator 307 and the thermal sensor 304. The processing device 308 includes at least an adaptive algorithm 308a stored in the memory of the processing device 308 (please refer to FIG. 5), the adaptive algorithm 308a may be stored in other memory outside the processing device 308. The processing device 308 fetches the thermal signals from the thermal sensor 304, gets access to the database 310 and instructs the adaptive algorithm 308a to analysis the optimal setting for the adaptive compensator 307 based on the color-specific response trend of the thermal signals stored in the database 310. The optimal setting of the adaptive compensator 307 is dynamically adjustable and is correlated to rotation angles of the adaptive compensator 307, the rotation angles can be controlled by rotating the rotation stage 307b of the adaptive compensator 307 through control signals sent from the processing device 308. The control signals for controlling the rotation of the adaptive compensator 307 are used to control the movements of the adaptive compensator 307 from its current angle to a target angle, where the target angle of the adaptive compensator 307 at a temperature is calculated and determined by checking the angle value corresponding to the peak value of the color-specific response trend at that particular temperature stored in the database 310. In the case that no existing color-specific response trend of a thermal signal can be found in the database 310, an interpolating or extrapolating step can be used to generate corresponding target angle for the adaptive compensator 307 to be rotated thereto. In some embodiments, the database 310 can be in form of a lookup table (LUT). In some embodiments, the rotation angles are in range of negative 10 degree to positive 10 degree.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" and "connected" may also mean that two or more elements are not in direct contact with each other, but yet still cooperate or interact with each other.

While various embodiments of the present invention have been described above, it should be understood that they have been presented by a way of example and not limitation. Numerous modifications and variations within the scope of the invention are possible. The present invention should only be defined in accordance with the following claims.

What is claimed is:

1. A liquid crystal on silicon (LCOS) device, comprising:
   a liquid crystal on silicon (LCOS) module with a thermal sensor disposed on a circuit board;
      a compensator with a rotatable device disposed on a top of said LCOS module; and
      a processing device formed on said circuit board and being responsive to a color-specific response trend of thermal signals to control rotation angles of said compensator according to said thermal signals received from said thermal sensor.

2. The LCOS device of claim 1, wherein said processing device is coupled to a database storing said color-specific response trend of thermal signals with corresponding said rotation angles.

3. The LCOS device of claim 2, wherein said LCOS module is operable to perform a setting test by the following steps:
monitoring color-specific responses of said LCOS module according to temperatures measured by said thermal sensor;
establishing said database according to said color-specific responses;
performing an optimal setting of said compensator by said processing device based on said database; and
wherein said optimal setting of said compensator is dynamically adjustable according to said temperatures measured by said thermal sensor.

4. The LCOS device of claim 2, wherein database is in form of a lookup table.

5. The LCOS device of claim 3, wherein said color-specific response trend of said thermal signals includes said color-specific responses measured by rotating said compensator at various angles corresponding to each of said thermal signals.

6. The LCOS device of claim 5, wherein said thermal signals include voltage signals corresponding to temperatures measured by said thermal sensor.

7. The LCOS device of claim 1, wherein said LCOS module comprising a liquid crystal layer on a silicon backplane.

8. The LCOS device of claim 1, wherein said rotation angles are obtained by rotating an angle actuator coupled to said compensator through control signals sent from said processing device.

9. The LCOS device of claim 1, wherein said rotation angles are in range of negative 10 to positive 10 degree.

10. The LCOS device of claim 1, wherein said circuit board includes a flexible printed circuit board.

11. The LCOS device of claim 1, wherein said compensator is disposed on a display area of said LCOS module.

12. A liquid crystal on silicon (LCOS) device, comprising:
a liquid crystal on silicon (LCOS) module with a thermal sensor disposed on a flexible circuit board;
a compensator disposed on a top of a display area of said LCOS module; and
a rotatable device coupled to said compensator being responsive to a color-specific response trend of thermal signals to control rotation angles of said compensator according to said thermal signals received from said thermal sensor.

13. The LCOS device of claim 12, wherein said thermal sensor is a temperature sensor embedded in said LCOS module.

14. The LCOS device of claim 12, wherein said rotatable device is coupled to a database storing said color-specific response trend of thermal signals with corresponding rotation angles.

15. The LCOS device of claim 14, wherein said color-specific response trend of said thermal signals are temperature dependent color-specific contrast ratios measured by rotating said compensator at various angles.

16. The LCOS device of claim 14, wherein said LCOS module is operable to perform a setting test by the following steps:
monitoring color-specific responses of said LCOS module according to temperatures measured by said thermal sensor;
establishing said database according to said color-specific responses; and
performing an optimal setting of said compensator by said rotatable device based on said database;
wherein said optimal setting of said compensator is dynamically adjustable according to said temperatures measured by said thermal sensor.

17. The LCOS device of claim 14, wherein said database is in form of a lookup table.

18. The LCOS device of claim 12, wherein said LCOS module comprising a liquid crystal layer on a silicon backplane.

19. The LCOS device of claim 12, wherein said rotatable device is an angle actuator.

20. The LCOS device of claim 12, wherein said rotating angles are in range of negative 10 to positive 10 degree.

* * * * *